C. W. VON DORN.
COLLAPSIBLE FLY TRAP.
APPLICATION FILED MAY 22, 1913.
1,136,452.
Patented Apr. 20, 1915.
3 SHEETS—SHEET 2.
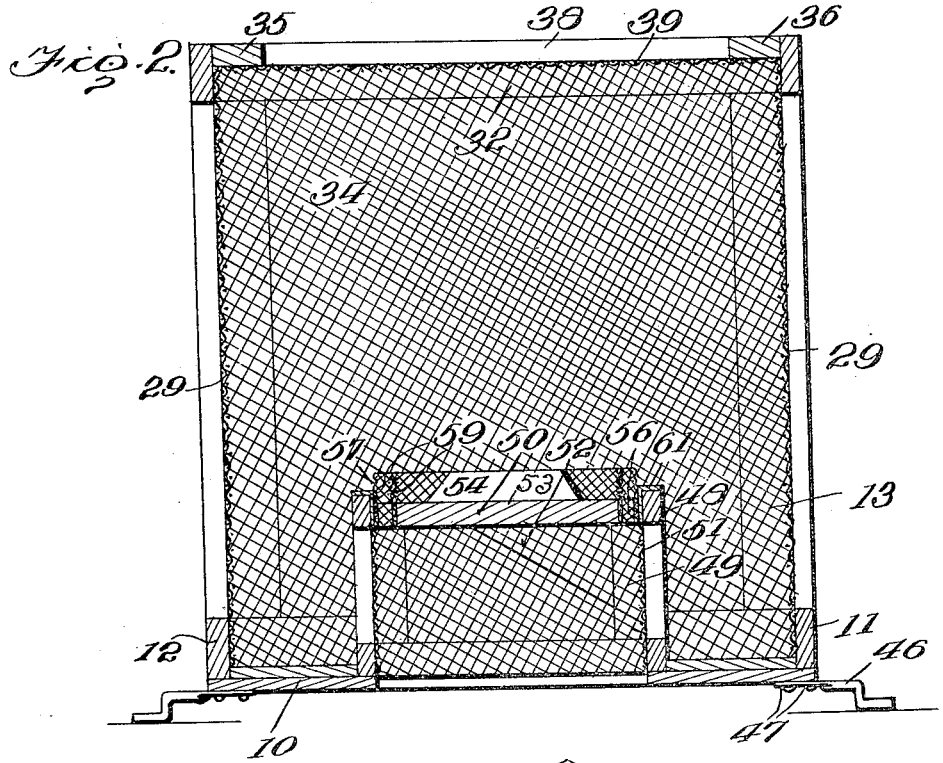
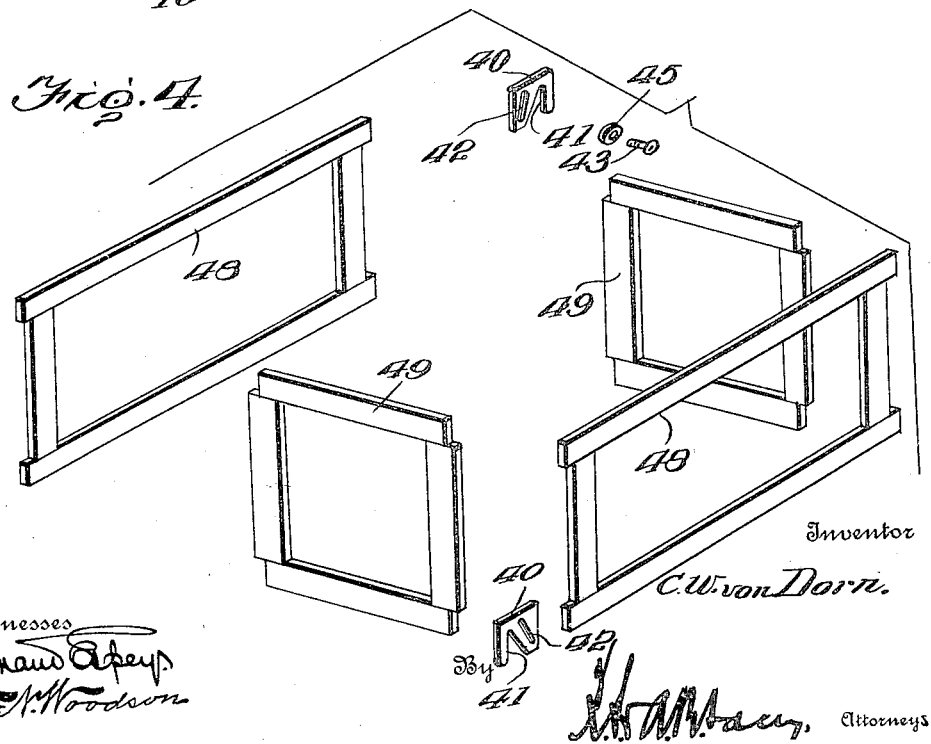

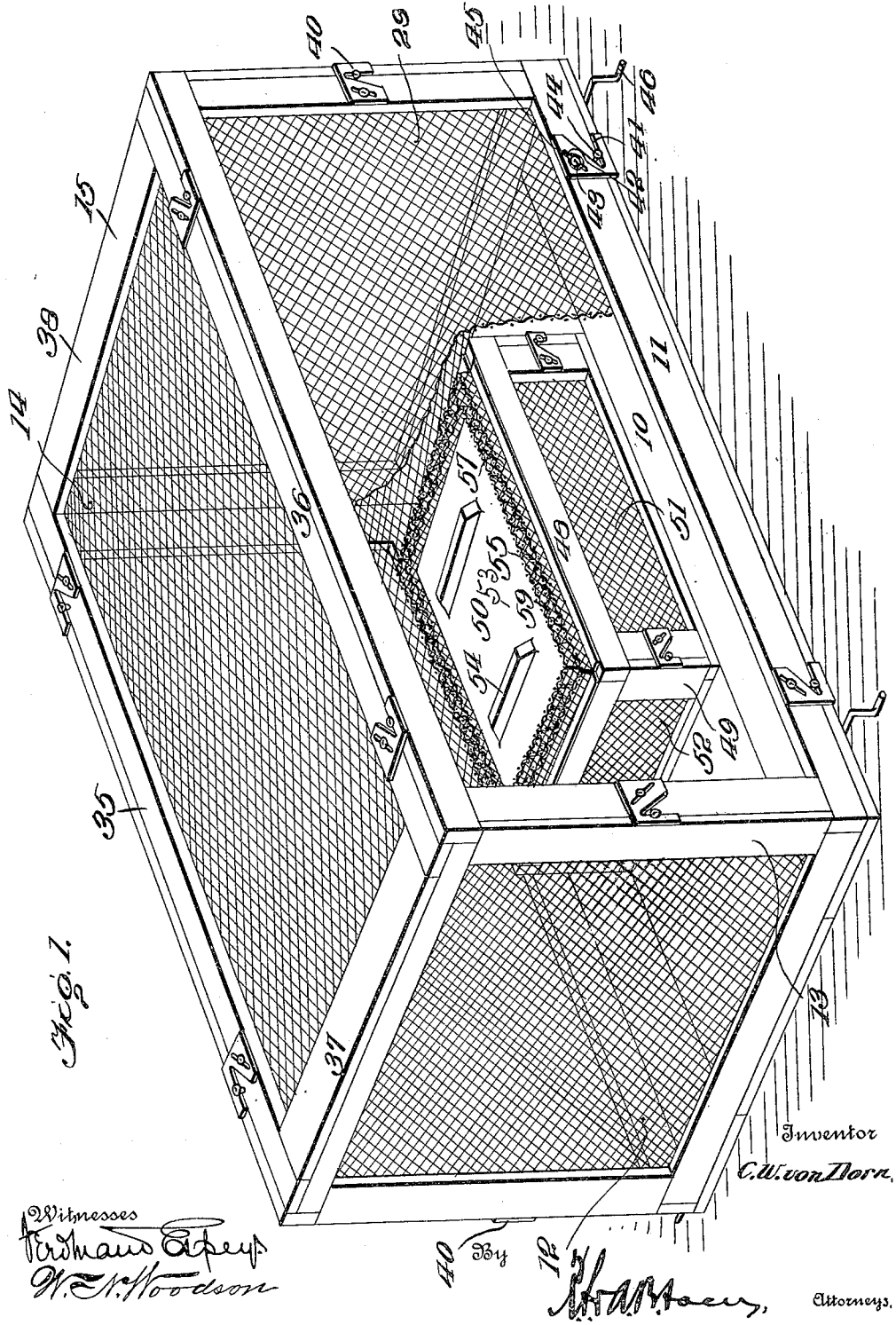

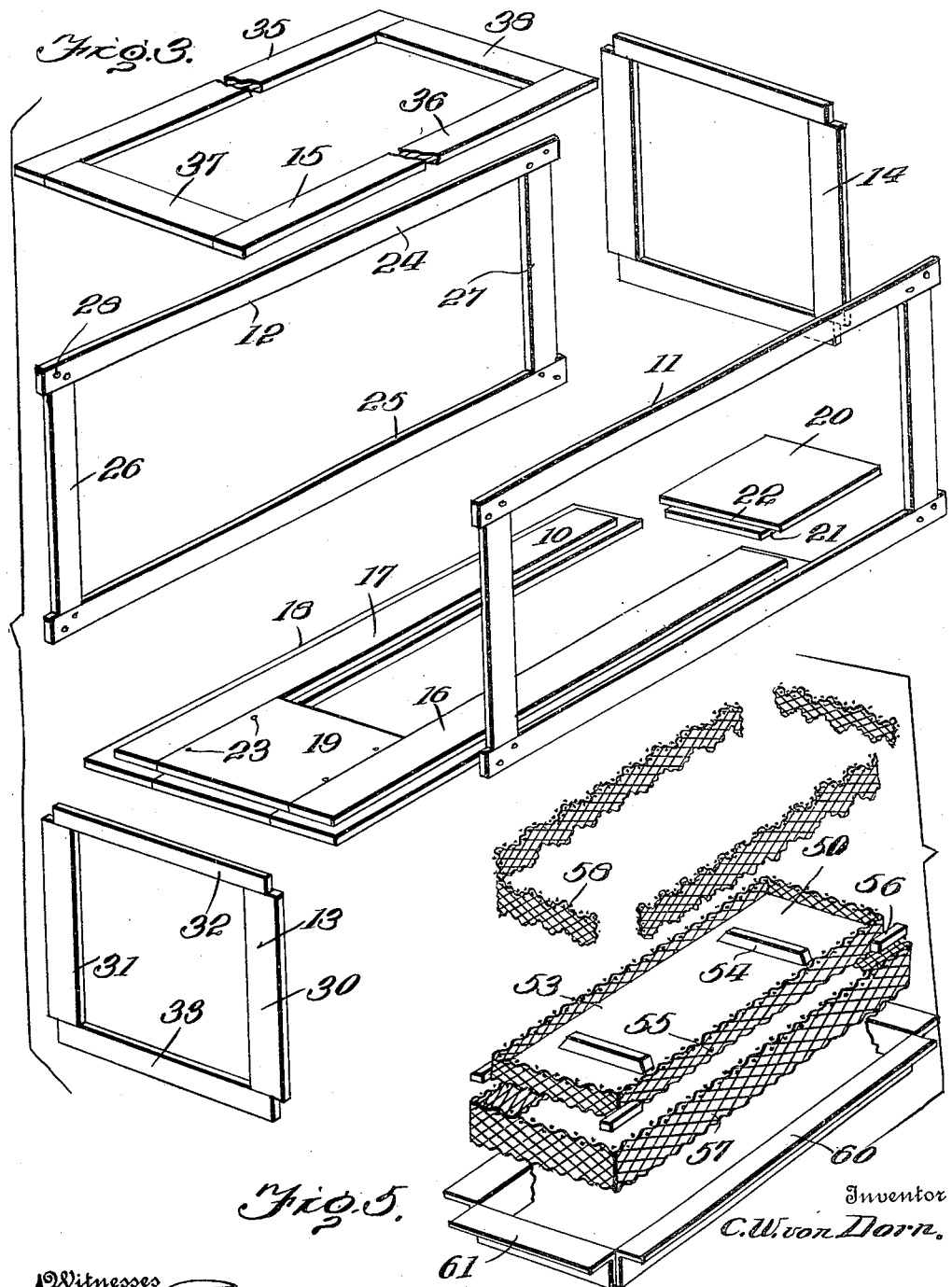

UNITED STATES PATENT OFFICE.

CALVIN W. von DORN, OF ALBUQUERQUE, NEW MEXICO, ASSIGNOR OF ONE-THIRD TO CECIL K. SCHAFER, OF NACO, ARIZONA.

COLLAPSIBLE FLY-TRAP.

1,136,452.   Specification of Letters Patent.   Patented Apr. 20, 1915.

Application filed May 22, 1913. Serial No. 769,260.

*To all whom it may concern:*

Be it known that I, CALVIN W. von DORN, citizen of the United States, residing at Albuquerque, in the county of Bernalillo and State of New Mexico, have invented certain new and useful Improvements in Collapsible Fly-Traps, of which the following is a specification.

My invention relates to new and useful improvements in traps for catching flies and other insects and the object of my invention is to provide a fly trap including inner and outer body members so arranged that the flies pass through the bottom of the outer body member into the inner member and through reduced openings in the top of the inner member into the space between the inner and outer members, in which space they are trapped, due to the fact that a fly will not crawl downwardly through a small opening and so cannot escape through the openings by which they entered.

A further object of my invention is to provide a fly trap of the above described character in which the inner and outer body members are separable from each other and in which each of said members may be taken apart in order to permit the shipping or storing of the trap in knocked down condition.

A further object of my invention is to provide a novel form of top for the inner body member in which the reduced openings through which the flies pass are formed between the edge of the top member proper and a strip of foraminous material spaced from the edge, the space thus formed between the two being further reduced by the interposition of a crimped baffle member of foraminous material.

In this connection, a further object of my invention is to provide the top with braces which serve as handles for removing the top and which also serve to protect the strips of foraminous material from injury when the trap is in knocked down position, this being of importance inasmuch as the said strips extend above the upper face of the top of the inner body member.

A still further object of my invention is to provide a novel form of hook for securing the various parts of both the inner and outer body members together.

With these and other objects in view, my invention will be more fully described, illustrated in the accompanying drawings, and then specifically pointed out in the claims which are attached to and form a part of this application.

In the drawings: Figure 1 is a perspective view of my improved trap, a portion of the foraminous covering of the outer body member being broken away to more clearly show the construction of the inner body member; Fig. 2 is a central, vertical transverse sectional view further showing the construction of the trap; Fig. 3 is a perspective view of the various frame members making up the outer body of the trap, showing the same disconnected from each other; Fig. 4 is a similar view of the various portions of the inner body member, with the exception of the top thereof; Fig. 5 is a similar view, showing the construction of the top of the inner body member.

Corresponding and like parts are referred to in the following description and indicated in all the views of the drawings by the same reference characters.

The trap, as previously stated, includes an outer and an inner body member and the outer body member includes a bottom 10, side walls 11 and 12, end walls 13 and 14 and a top 15.

The bottom is formed of wood, as is in fact the entire framework of the body member and includes spaced strips 16 and 17, the upper faces of which are rabbeted along both side and end edges as shown at 18. The bottom further includes end strips 19 and 20, the lower side edges of which are rabbeted as at 21 to permit the seating of the said end strips between the end portions of the side strips in the manner clearly shown in Fig. 3 of the drawings and the upper faces of the said end strips are rabbeted along their remaining edges as at 22 to form in effect continuations of the inner and outer rabbeted edges of the strips 16 and 17 when the members 16, 17, 19 and 20 are secured together to form the bottom. These parts are secured to each other by nails or other suitable fastening devices 23.

The side walls 11 and 12 are identical in construction and a description of one will therefore suffice for both. Each of these side walls includes a rectangular frame formed from upper and lower strips of wood 24 and 25 connected adjacent their ends by vertically extending strips 26 and 27, the said strips being secured to each other by nails, screws or other fastening devices 28 in such a manner that the strips 24 and 25 are parallel to each other, while the strips 26 and 27 are also parallel. These strips are equal in thickness to the lateral flanges or shoulders formed by rabbeting the outer edges of the members 16 and 18 of the bottom and seat by their lower edges in the rabbets thereof. As clearly shown, the ends of both the strips 24 and 25 extend slightly beyond the outer faces of the strips 26 and 27. The side wall frames thus formed are provided with a covering of foraminous material 29 which is preferably secured to the inner faces of the strips making up the frames.

The end walls are also identical with each other in construction, each including a rectangular frame constructed in substantially the same manner as the frames forming the side walls with the exception that the vertical frame forming strips 30 and 31 extend by their outer edges slightly beyond the ends of the upper and lower frame forming strips 32 and 33. Furthermore, the upper strips 32 are narrower than the lower strips and when the end frames are positioned to rest in the rabbets at the outer ends of the bottom frame or base of the outer body and between the ends of the side frames, the upper edges of the strips 32 are positioned at a somewhat lower level than at the upper edges of the strips 24. This construction is clearly brought out in Fig. 1 of the drawings and the manner in which the side and end wall frames are fitted to each other and to the bottom clearly shown. The end walls are in like manner covered with foraminous material 34.

The top includes a rectangular frame comprising side members 35 and 36 connected at their ends by end members 37 and 38, the frame thus formed being proportioned to fit between the upper edges of the side walls and to rest by its ends at the upper edges of the end walls and being covered by a foraminous screen 39.

The side walls are secured to the end walls and to the bottom and the top is secured to the upper edges of the side walls by a plurality of hook fastening devices 40. Each of these fastening devices includes a substantially rectangular shape plate of metal notched adjacent one end as shown at 41 with one edge of the notch extending parallel to the adjacent end of the plate and with the other edge inclined therefrom and provided at its opposite end with a slot 42 formed at substantially the same inclination. These fastening hooks are slidably secured to the various frame members by pins 43 passed one through each of the slots 42 and the hooks formed by the notches engage pivot pins or studs 44 carried by the adjacent member to be secured. These fastening members or hook forming plates are then slipped along the pins 43 to seat the latter in that end of the slot nearest the rear end of the plate as a whole and the bill portion of the hook moved into operative position with respect to the keeper pin 44. The entire plate is then moved transversely and because of the engagement of the pin 43 in the slot 42 it will be apparent that the bill of the hook will be drawn into locking engagement with the pin 44 to firmly bind the parts together. Washers 45 are preferably inserted between the heads of the pins or screws 43 and the plate forming the body of the hook.

The outer body member of the trap, above described, is supported in slightly spaced relation above the floor or ground by a plurality of feet 46 secured to the bottom of the trap. These supporting feet or legs each is formed from a rod of metal having one end flattened in order that it may be secured to the trap by screws or other fastening devices 47 and having its opposite end extended laterally beyond the trap and downwardly and then outwardly therefrom, the object being to space the downturned portions of the feet beyond the bottom of the trap in order that the various walls of the trap may be laid against the lower face of the bottom when the trap is knocked down for shipment or storage.

The inner body member of the trap includes side walls 48, end walls 49 and a top 50. The side walls and end walls are identical in construction with the side and end walls of the outer body with the exception that the strips forming the upper portion of the frames of the end walls are equal in height to the strips forming the upper portions of the frames of the side walls, as clearly shown in Figs. 1 and 4 of the drawings. These frames are seated by their lower edges in the rabbets formed in the inner edges of the strips forming the bottom of the outer body member and are secured to each other by hooks similar to those employed in securing the outer frame members together. The side walls of the inner body member are covered with foraminous material 51, while the end walls are similarly covered with foraminous material 52.

The top of the inner body member of the trap differs however, greatly from the top of the outer body member thereof. Said top includes a rectangular imperforate body member 53, preferably formed of wood, provided adjacent its ends with transversely extending braces 54 and surrounded by a strip of foraminous material 55 the lower edge of which is flush with the lower face of the top 53 and the upper edge of which extends slightly, say one inch, above the top. Secured to the side edges of the top and projecting beyond the ends thereof are spacer blocks 56 and surrounding the edge of the body member 53 and secured to the spacer blocks is a strip of foraminous material 57, the lower edge of which is flush with the bottom of the member 53 and the upper edge of which extends above the same terminating in a plane with the upper faces of the braces 54. It will therefore be seen that the spacer blocks 56 serve to hold this strip of foraminous material 57 in spaced relation to the member 53. Strips of foraminous material are crimped to form baffle members 58 and said members are inserted between the surrounding strips of foraminous material 55 and 57 to provide a plurality of reduced passages 59, as best shown in Fig. 1 of the drawings. Strips of sheet metal 60 L-shaped in cross section are secured to the sides and similar strips 61 are secured to the ends of the top thus formed, being fastened to the spacer blocks 56 in such a manner that their vertical flanges bear against the outer face of the foraminous strip 57, while their laterally directed flanges are adapted to seat upon the upper frame strips of the side and end walls of the inner body member when the top is positioned in place, as shown in Fig. 2 of the drawings.

In operation, the above described trap is assembled in the manner shown in Figs. 1 and 2 of the drawings and any suitable baiting material may then be placed in the space between the inner and outer body members of the trap. Flies and other insects attracted by said bait will pass beneath the trap and through the opening in the bottom of the outer body member into the inner body member from which they will pass through the reduced passages formed by the crimped baffle members into the space between the inner and outer body members. It is a well known fact that most insects and particularly flies will not, under ordinary circumstances, crawl downwardly, particularly from a lighter to a darker chamber and it is further well known that flies will not pass downwardly through reduced passages although they will pass upwardly through the same freely. For this reason, flies after having once entered the space between the trap members, will not escape through the passages.

It will be apparent that by releasing the tension hooks 40, the outer body member of the trap may be readily disassembled and then the inner body member disassembled when the various frames may be packed in compact form for shipment or storage. When so packed, the braces 54 of the top of the inner body member, which also act as handles for assisting in the positioning and removal of said top, extending with their upper faces in the plane of the upper edges of the foraminous strips 55 and 57 and baffle strips 58, serve to a great extent to protect said strips from injury, due to crushing of the top between other members of the trap.

Although I have illustrated and described a specific form of collapsible trap in all its details, it will of course be understood that I do not wish to limit myself to the specific details of construction shown or to the specific materials mentioned as the framework, instead of being made of wood, may be made of metal secured by interlocking beads of any suitable type. In other words, I reserve the right to make any minor changes within the scope of the appended claims, without in the slightest degree departing from the spirit of my invention.

Having thus described the invention, what is claimed as new is:

1. A fly trap including a rectangular bottom forming frame having its inner and outer edges rabbeted, side and end frames covered with foraminous material seating by their lower edges in the rabbets of the outer edges of the bottom, a top covered with foraminous material resting upon the upper edges of the end frames and between the upper edges of the side frames, means for detachably connecting the side frames to the bottom and end frames and the top to the side frames, and an inner body member including detachable side and end frames seating by their lower edges in the rabbets of the inner edges of the bottom, an imperforate top mounted between the upper edges of the side and end walls of the inner body member with its edges spaced therefrom, and crimped baffle members interposed between the top and edges of said frames to provide a plurality of reduced passages.

2. A fly trap including side and end frames covered with foraminous material, a top provided at its ends with spacer blocks, said top being imperforate, a strip of foraminous material surrounding the top and held in spaced relation by the spacer blocks and extending by its upper edge above the top, strips of crimped foraminous material interposed between the first strip and the edges of the top to provide a plurality of reduced passages, supporting strips L-shaped in cross section secured to the spacer blocks by one flange and with their other flanges extending laterally to rest upon the side and end wall frames when the top is in place, and an outer body member inclosing the inner body member and provided in its bottom with an opening communicating with the inner body member.

3. A fly trap including a bottom provided with an opening, outer side and end walls and top wall, each including a frame covered with foraminous material, said parts forming an outer body member, an inner body member positioned within the outer body member and communicating with the opening in the bottom thereof, said inner body member being provided with a plurality of reduced passages communicating with the outer body member, and means for detachably securing the outer top, side and end walls and bottom to each other, said means including pins carried by adjacent members to be secured, a plate of sheet metal provided with a diagonally extending slot through which one of the pins pass and with a notch for engagement with the other pin, one edge of said notch being parallel to one edge of the plate, while the opposite edge is parallel to the slot.

4. A trap including a bottom having spaced side and end strips both edges of all of which are rabbeted, side walls including frames covered with foraminous material and seating in the rabbeted edges of the bottom, each frame including upper and lower strips and end strips connecting the upper and lower strips and spaced from the ends thereof, end walls, each including frames covered with foraminous material and seating in the rabbeted portions of the bottom, each end wall frame including upper and lower strips bearing between the ends of the upper and lower strips of the side walls and end strips bearing against the end strips of the side walls between the ends of the upper and lower strips thereof, a top including a frame covered with foraminous material seating upon the upper strips of the end walls and between the upper strips of the side walls, means for securing said members together, and an inner member seated upon the bottom of the outer member and provided in its upper end with a plurality of reduced passages.

5. A fly trap including inner and outer body members spaced from each other, a common bottom for the two having an opening communicating with the inner body member, and a removable top for the inner body member, said top including a top proper, smaller in size than the inner body member, a strip of foraminous material peripherally surrounding the top proper and projecting at its free edge above the top proper, spacer blocks secured at intervals to the peripheral edge of the top proper, a similar strip of foraminous material surrounding the top proper and secured to the spacer blocks in spaced relation to the first strip, strips of crimped foraminous material interposed between the first and second strips to provide a plurality of reduced passages, and a plurality of top supporting strips, L-shaped in cross section, bearing each by one flange against the outer strip of foraminous material, being secured to the spacer blocks, and adapted to rest by and with their outwardly directed flanges upon the upper edge of the inner body member.

6. A fly trap including inner and outer body members closed at their upper ends and open at their lower ends, the closure of the upper end of the inner body member having restricted passages, and a common supporting base for both body members, said base including side strips having their upper faces rabbeted along all edges, end-strips having their lower faces rabbeted for coacting engagement with the rabbeted inner edges of the side strips and having their upper faces rabbeted along their side edges to form continuations of the rabbeted portions of the side strips, the inner and outer body members seating at their lower edges in rabbets formed along the outer edges of the side and end-strips and along the inner edges of the side and end-strips, respectively.

7. A fly trap including inner and outer body members of foraminous material having alined openings in their bottoms, the inner body member being open at its top, and a top for the inner body member, said top including a body proper, a surrounding strip of foraminous material secured to the body proper, spacer blocks secured against the outer faces of the strip, an additional strip of foraminous material surrounding the first strip and secured to the spacer blocks and maintained in spaced relation to the first strip thereby, crimped strips of foraminous material interposed between the first and second mentioned strips to provide a plurality of restricted openings, and means surrounding the second mentioned strip for supporting the top and the open upper end of the inner body member.

In testimony whereof I affix my signature in presence of two witnesses.

CALVIN W. von DORN. [L. S.]

Witnesses:
L. A. RICE,
G. B. FAWKS.